United States Patent [19]
Walser et al.

[11] Patent Number: 5,181,202
[45] Date of Patent: Jan. 19, 1993

[54] RING BUS STATION HAVING DUAL OSCILLATORS

[75] Inventors: Robert A. Walser, West Point, Calif.; Earl E. Rydell, Swisher, Iowa

[73] Assignee: FMC Corporation, Chicago, Ill.

[21] Appl. No.: 652,834

[22] Filed: Feb. 6, 1991

[51] Int. Cl.⁵ .............................................. H04J 3/02
[52] U.S. Cl. ........................ 370/85.15; 370/85.12; 370/100.1; 370/85.5
[58] Field of Search ............ 370/85.12, 85.6, 85.7, 370/85.15, 105.3, 100.1, 85.5; 340/825.5

[56] References Cited

U.S. PATENT DOCUMENTS

| | | | |
|---|---|---|---|
| 3,980,820 | 9/1976 | Niemi | 370/105.3 |
| 4,553,234 | 11/1985 | Brandsmo | 370/85.7 |
| 4,602,365 | 7/1986 | White | 370/85.6 |
| 4,627,070 | 12/1986 | Champlin | 370/85.15 |
| 4,646,291 | 2/1987 | Perntz | 370/100.1 |
| 4,665,518 | 5/1987 | Champlin | 370/85.12 |
| 4,759,015 | 7/1988 | Takai | 370/85.15 |
| 4,760,571 | 7/1988 | Schwarz | 370/85.15 |
| 4,982,400 | 1/1991 | Ebersole | 370/85.12 |

*Primary Examiner*—Douglas W. Olms
*Assistant Examiner*—Temesghen Samuel

*Attorney, Agent, or Firm*—Michael Lee; R. C. Kamp; R. B. Megley

[57] ABSTRACT

A transmit-receive station connected to a high speed ring bus carrying data signals that may be received from and sent to each station on the ring bus has two sources of transmit clocking signals. One source is based on the frequency and phase of data signals received on the ring bus from another station and the other source is a local crystal oscillator having essentially the same frequency as the first source but in an indeterminate phase. When changing the source of clocking signals for transmission of data originating at the station, bit slippage may be minimized by providing the local oscillator output signal in four phases and using the phase most nearly aligned with the other clocking signal when the change is made.

Control of access to transmit by a station employs a token having a message field of seven bits and a access control bit. Each message from ready for transmission is assigned a priority number which is used with the token to cause the data message frames at different stations to be transmitted in a sequence based on their respective priority numbers.

22 Claims, 5 Drawing Sheets

FIG_2

FIG_3

FIG_4

FIG_6

FIG_7

RING BUS STATION HAVING DUAL OSCILLATORS

This invention relates to high speed ring bus data transmission systems for transmitting data between a plurality of interconnected and serially arranged stations, and more particularly to a system for minimizing bit slippage when transferring clock sources for controlling the station transmitter.

BACKGROUND

Networking among a large number of data stations has found widespread use. A ring bus may be connected to a number of stations each of which has the capacity to receive from and transmit to the others. A number of prior efforts are described in Champlin et al. U.S. Pat. Nos. 4,665,518 granted May 12, 1987, 4,627,070 granted Dec. 2, 1986 and 4,486,852 granted Dec. 4, 1984; Miller et al. U.S. Pat. No. 4,038,494 granted Jul. 26, 1977 and Niemi et al. U.S. Pat. No. 3,980,820 granted Sep. 14, 1976. Familiarity with the disclosures in these patents will assist in understanding the present invention which constitutes an improvement that allows operation of the data bus at higher speeds without loss of integrity of the transmitted signal.

SUMMARY OF INVENTION

An object of this invention is to provide an improved transmit-receive station in an ring bus where the station transmitter operates under the control of either of two clock signals, one of which is based on the received data signal frequency and phase that is used when relaying the signal, and the other of which is from a local crystal oscillator which controls the ring bus when sending data information that originates at the station. One benefit from the use of the local crystal oscillator is that a master oscillator at a fixed location on the ring bus is not required. Another benefit follows from the fact that when relaying received data signals, the oscillator whose frequency and phase is controlled by the incoming signal can operate indefinitely without running into phase drift problems which can result in data loss.

Another object of the invention is to provide a phase select circuit for maintaining synchronization between the clock signal produced by a receive signal controlled oscillator and the clock signal provided by the local crystal controlled oscillator. A benefit is provided because when the station changes from relaying signals originating from another station that requires using one clock signal, to sending a data message originating at the local station that requires using a clocking signal from the local crystal controlled oscillator, the phase shift of the signal transmitted on the ring bus that relates to the bit slippage at the time when the change in the clocking signal is made, is minimized.

A further benefit is provided by comparing the selected phase of the local crystal oscillator and the VCO prior to returning to the relay mode of operation and selecting the proper phase of the VCO 22 in order to minimize the bit slippage during this change.

A further feature of this invention resides in providing a novel technique for controlling changeover of the station from a closed condition during which data message frames are relayed and an open condition during which a data message frame originating at the station is transmitted on the ring bus. Each data message frame is followed by a token that indicates access to transmit is available to closed stations on the ring bus. Until one of those closed stations on the ring bus becomes an open station, the token is re-issued by the station last to transmit. Upon receipt by the issuing station of a token that has been modified to have a "busy" status, the open station is closed and the responsibility for maintaining the token on the ring bus passes to the newly open station.

These and other objectives of the invention will become more fully apparent from the claims and from the description when read in conjunction with the drawings.

DETAILED DESCRIPTION OF PREFERRED EMBODIMENT

Figure 1:
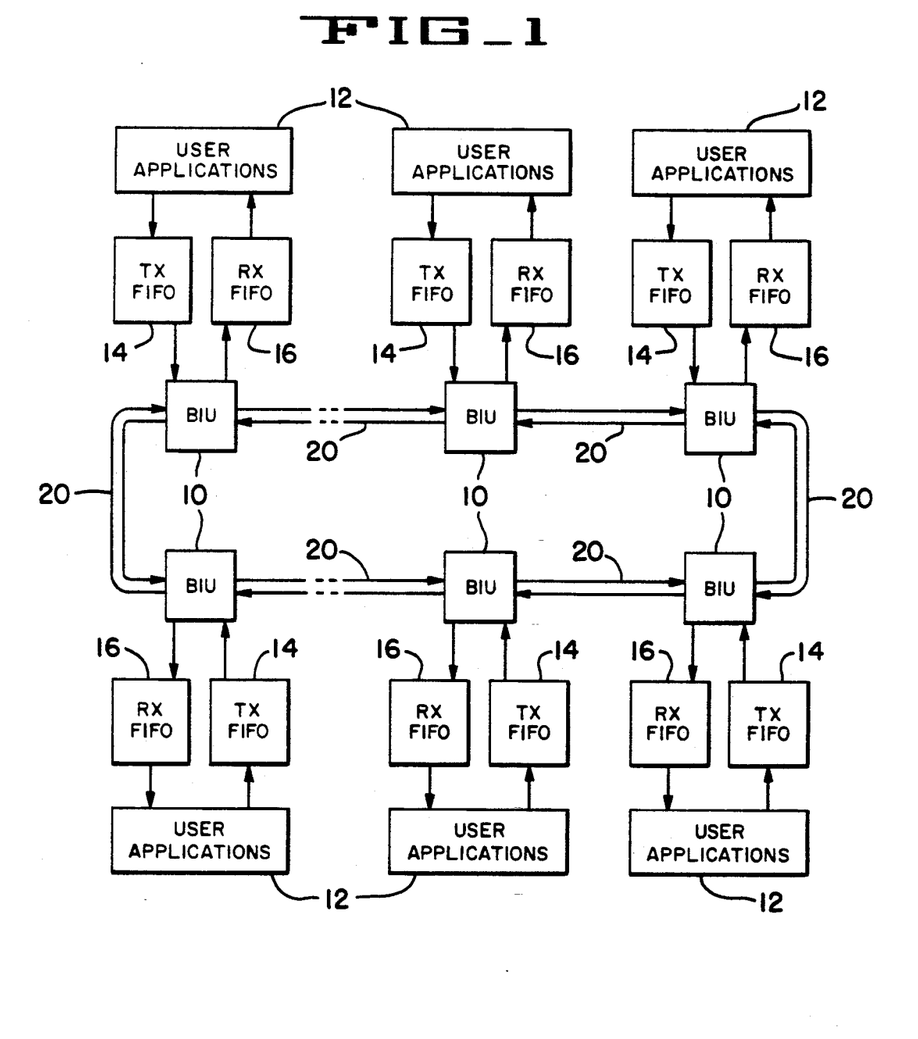
FIG. 1 is a diagrammatic view of a dual channel ring bus which connects a group of stations together in a communication network in which the present invention is adapted for use.

The basic configuration of the system embodying the present invention is illustrated in FIG. 1 and includes a large number, up to 50 or more, bus interface units (BIU) 10 which are connected in series around a dual counter flow data transmission ring bus so that each station can transmit to each other station on a priority access basis on the active ring. BIU 10 serves to interconnect a user application 12 at each station and each station may have a transmit or a receive capability, or both, by using separate transmit FIFO buffer memories 14 and receive FIFO buffer memories 16.

As in the asynchronous bus system described in the Champlin et al. U.S. Pat. No. 4,627,070, the disclosure of which is hereby incorporated by reference, the media segments 20 may be any suitable transmission media and form a dual ring bus. Currently preferred media are RF cables, twisted pair wires or fiber optical cables. The media are routed between BIU 10 of adjacent stations. The media 20 are physically separate and electrically or optically connected in parallel so that if one transmission media between two adjacent stations becomes defective, transmission will automatically and without operator intervention switch to alternate media. In the event of a break in both media between the same two adjacent stations, transmission can yet be maintained with a method of loopback as explained in U.S. Pat. No. 4,627,070 as a hybrid loop.

Figure 2:
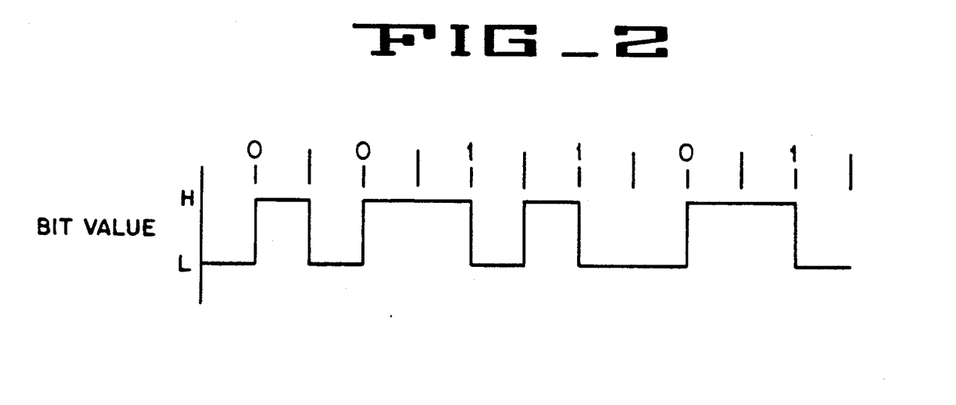
FIG. 2 is a waveform of a phase encoded binary signal known as Manchester encoding.

The system preferably employs a phase encoded signal such as the Manchester code as illustrated in FIG. 2. This conventional signal comprises a series of bit periods with the data signal either rising to indicate a logic 0 or falling to indicate a logic 1 at exactly the mid point of the bit. Thus, the data has equal excursions about a neutral point and the use of this code prevents loop currents from degrading the data signal with wire media. Also, the same pulse train on a single transmission signal channel can carry access control, test and sync signals as well as data messages of varying duration.

Figure 3:
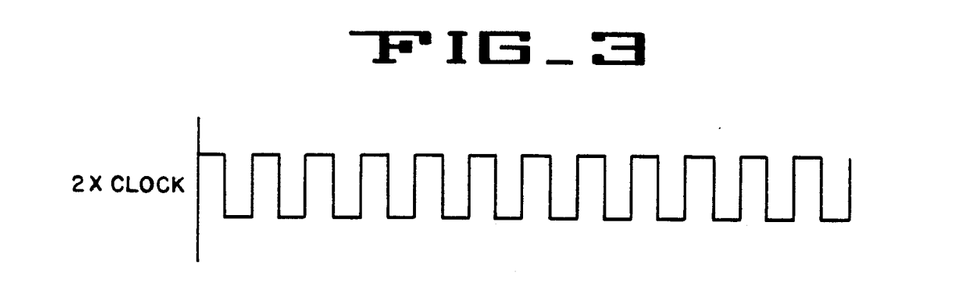
FIG. 3 is a received clock signal at twice the bit frequency of the incoming signal of FIG. 2.
Figure 4:
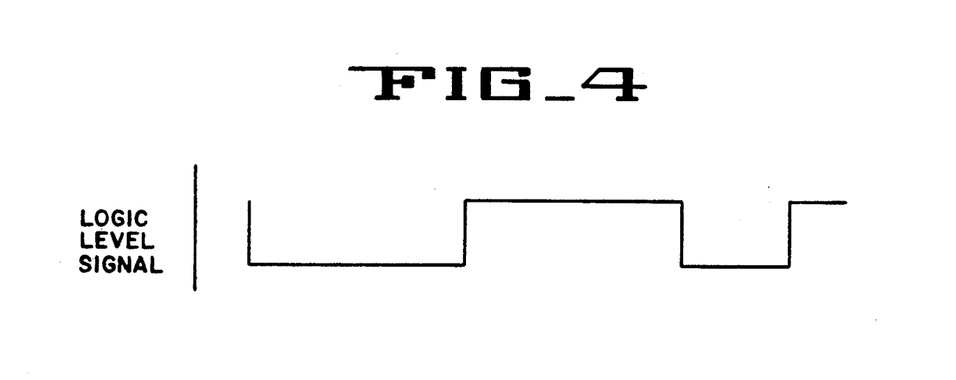
FIG. 4 is a pulse wave form of the logic level format carrying the same data information as in FIG. 2.
Figure 5:
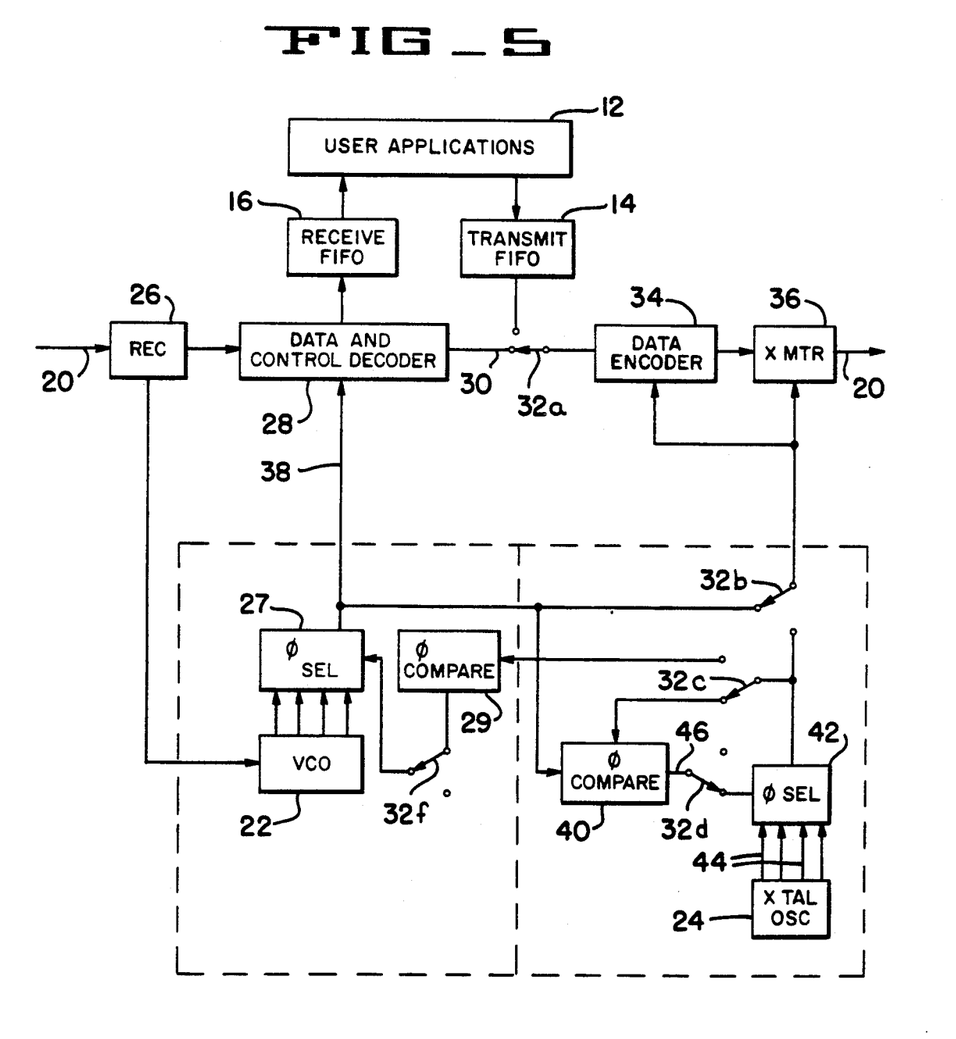
FIG. 5 is a block diagram illustrating use of dual oscillators in accord with the present invention.

The incoming signal of FIG. 2 is applied to the data and control decoder stage 28 in FIG. 5 which produces an output signal having a logic signal as shown in FIG. 4. The voltage controlled oscillator (VCO) 22 provides a output clock signal that is two times the bit frequency of the incoming pulse train signal and the frequency and phase are controlled in a manner known to those skilled in the art to be in sync with the incoming data signal. The output signal from the VCO 22 is illustrated in FIG. 3.

FIG. 5 is a block diagram of a relevant portion of one of the BIU stations 10 of FIG. 1 which employs dual oscillators 22 and 24. The received data signal in media 20 is provided to a receiver 26 which passes the clock transitions to VCO 22 and the digital signal of FIG. 2 and to data and control decoder stage 28 where the output signal is that of FIG. 4 and adapted for use in logic circuitry of a conventional type.

When the station is relaying a message that originated at another station, an output from decoder 28 on lead 30 of FIG. 5 is passed through switch 32a to data encoder 34. In data encoder 34, the data signal of FIG. 4 is converted back to a Manchester code as illustrated in FIG. 2 and clocked out of transmitter 36 which relays the data from encoder 34 along the next leg of the transmission media 20 as also illustrated in FIG. 1.

In an active ring bus environment, each closed station must repeat the data information traveling around the ring bus. The repeat or relay transmitter must maintain a synchronization with the incoming signal that is repeated. The present invention uses VCO 22 of FIG. 5 to generate a signal having a frequency that is twice the incoming bit frequency signal and applies that clocking signal on line 38 to the decoder 28. The same clocking signal is applied through switch 32b to both the encoder 34 and the transmitter 36. By this arrangement, the frequency and phase of the relayed signal is maintained in sync with the incoming or received data signal at a renewed power level.

If the incoming data signal is preceded by an address identifying this station as the recipient of the message, the incoming signal is stored in the received FIFO buffer memory 16 and made available to the user applications 12 of FIG. 1 in the usual manner.

When the user applications 12 has a message in transmit buffer FIFO 14 ready for transmission on the ring bus, the transmitter 36 must await receipt of a signal granting access to transmit on the ring bus. Access may be granted by the passing of a token at the end of a previous data transmission as is common in certain prior art systems or by other suitable techniques. When access is granted, switch contacts 32a move to the alternate position to that shown in FIG. 5 so that the transmit FIFO is connected to the input of data encoder 34. Switch contacts 32b move to their alternate position so that the clocking signal will originate from local oscillator 24 through phase selector 42 with the phase selected and locked when the station opened. When the signal which originates in transmit FIFO 14 has circulated around the ring bus, that signal returns to data decoder 28 and will not be re-transmitted, switch contacts 32a are in their alternate position. The signal may be addressed to receive buffer FIFO 16 and compared with the transmitted signal to determine if there has been signal error.

When switch contacts 32b move to their alternate position to change the source of the transmitter clocking signal from VCO 22 to the local crystal oscillator 24, the stations on the ring bus must lock in on the phase of the new clocking signal from oscillator 24. Assuming the frequencies of both oscillators 22 and 24 are essentially the same, it is important for a high speed (i.e. 10 to 20 MHz) ring bus to reduce the extent of bit slippage due to minor differences between individual crystal frequencies of different stations and the phase of the signal on the ring bus. In accordance with one feature of this invention the crystal oscillator 24 furnishes output signals on leads 44 that are phase shifted by 90 degrees so that when the clocking signal source is switched, the maximum bit shift can be limited to a quarter of a bit as a maximum and this locks the two clock signals to one eighth of a bit in phase slip.

To accomplish this switch of clock sources as the station closes with minimum phase slip, the phase of the clocking signal from VCO 22 may be constantly compared with the phase of the clocking signal from the local crystal oscillator 24 through switch contacts 32c by a phase comparison circuit 40. The output control signal from phase comparison circuit 40 on lead 46 and switch contacts 32d to phase select circuit 42 is effective to choose an output signal on that one of the leads 44 whose phase is closest to that of the clocking signal from VCO 22. At the moment when switch 32 is transferred and the clocking signal source is changed to local oscillator 24, the bit slippage at transmitter 36 due to phase shift of the transmitted signal is minimized.

When access to transmit is first given to a station, local oscillator 24 of that station begins to serve as a temporary master oscillator for the ring bus and the local oscillator 24 at the station previously opened for transmitting data signals originating at that station is no longer used. At the station which has just relinquished access to transmit, the clocking signals that came from its local crystal oscillator 24 and any phase shift of clocking signals of the chosen phase of VCO 22 at the moment of transition is not more than ¼ bit shifted in phase which limits the phase shift to ⅛ of a bit.

To accomplish this switch of clock sources as the station closes with minimum phase, slip, the selected phase of the crystal oscillator 24 through switch 32b is constantly compared in a phase compare circuit 29 to the phase output of the phase selector 27 when the station is open and originating data. When the station switches to the close position, the output of phase compare through switch contacts 32f causes a lock on the phase of phase selector 27 that produces a minimum phase slippage as the station closes.

Figure 6:
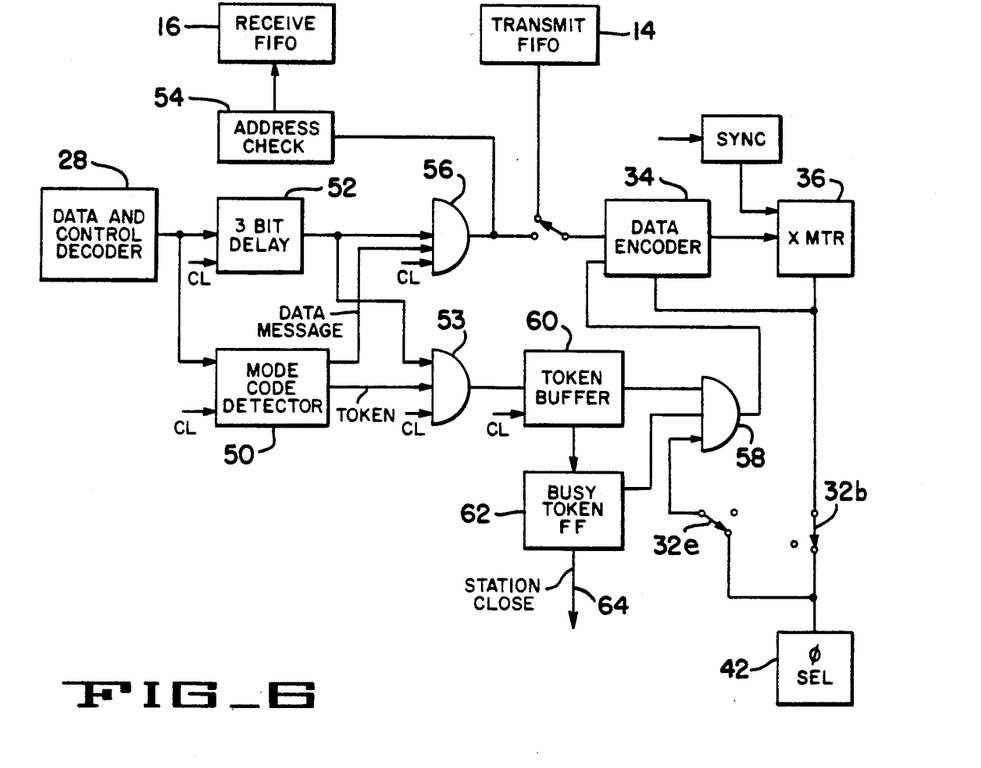
FIG. 6 is a block diagram of that portion of a station that is effective in converting an open station for transmitting data messages originating at the station to a closed station for relaying data messages originating at other stations on the ring bus.

Referring now to FIG. 6, the portion of the logic at each BIU station 10 in FIG. 1 that is effective to convert a previously open station to a closed station and to cause the transmitter 36 to convert from operating with clocking signals from local oscillator 24 to operating with clocking signals from VCO 22, is illustrated. After transmitting a data message frame from transmit FIFO 14, the station causes the token of FIG. 7 to be transmitted with an access control bit indicating that the ring bus is "available" for access by another station that may have a data message frame awaiting transmission. That token circulates around the ring bus of FIG. 1 and is received at data encoder 28 of FIGS. 5 and 6.

Figure 7:
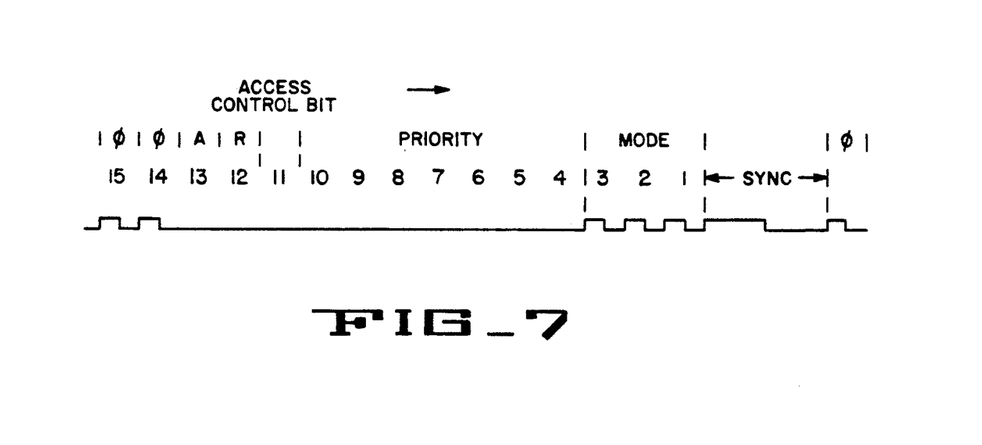
FIG. 7 is a diagram of a token which is included in the data stream on the ring bus that manages access to the ring bus so that only one station at a time can access the ring bus for transmitting data message frames. Frames are transmitted according to the priority of the message and this allows the access to be based on the priority field of the waiting message and the priority field contained within the access control message.

The token in Manchester format shown in FIG. 7 comprises first a sync signal that is followed by a three bit mode code field. A mode code for the illustrated token is three Manchester 0's. The mode code for a data message frame may have two Manchester 1's and one 0.

After the Manchester code signal is converted as described in connection with FIGS. 2-4, the signal is applied to a mode code detector 50 in FIG. 6 which produces two gating signals, one indicating a token and the other indicating a data message frame. If a token is received, the output data decoder 28, after a three bit delay in register 52, is clocked into a token buffer 60 through logic including AND gate 53. If a data message frame is received, the message is supplied to address detector 54 through AND gate 56 and is not retransmitted.

The token of FIG. 7 contains an access control bit in the eleventh position which, if a 0, indicates access to transmit is "available". If the bit in the eleventh position is a 1, the token indicates the ring bus is "busy" and that a data message frame follows. An output signal from the token buffer 60 controls "busy" token flip-flop 62 to produce output control signals. The "available" token signal is applied to logic including AND gate 58 which allows data fields in the token of FIG. 7 to be sent to the data encoder 34 under control of the clocking signal from the local crystal controlled oscillator through switch contacts 32e from phase select 42 as described in connection with FIG. 6. The token is then reissued as an "available" token.

Transmission of the reissued token remains the responsibility of the open station which was last to transmit a data message format. The transmitter 36 transmits Manchester 0's during intervals between transmissions of tokens and between transmission of token and a data message frames.

If the eleventh bit of a token is a 1, the token has a "busy" indication. This means another station on the ring has gained access to transmit. The crystal controlled oscillator 24 at the other station is concurrently transmitting a data message frame that is in the pulse train following this token.

The detection of a "busy" bit in the token of buffer 60 causes the "busy" token flip-flop 62 to trigger to its alternate position which, in effect, closes AND gate 58. This removes the token buffer from the system. The "busy" token flip-flop 56 also produces a station close signal on lead 64 that is effective to transfer all of the contacts associated with switch 32 to the position illustrated in FIG. 5. Thus the encoder 34 and the transmitter 36 are thereafter under control of the clock signals from VCO 22 and the station is in the closed or active relay mode of operation for data.

Figure 8:
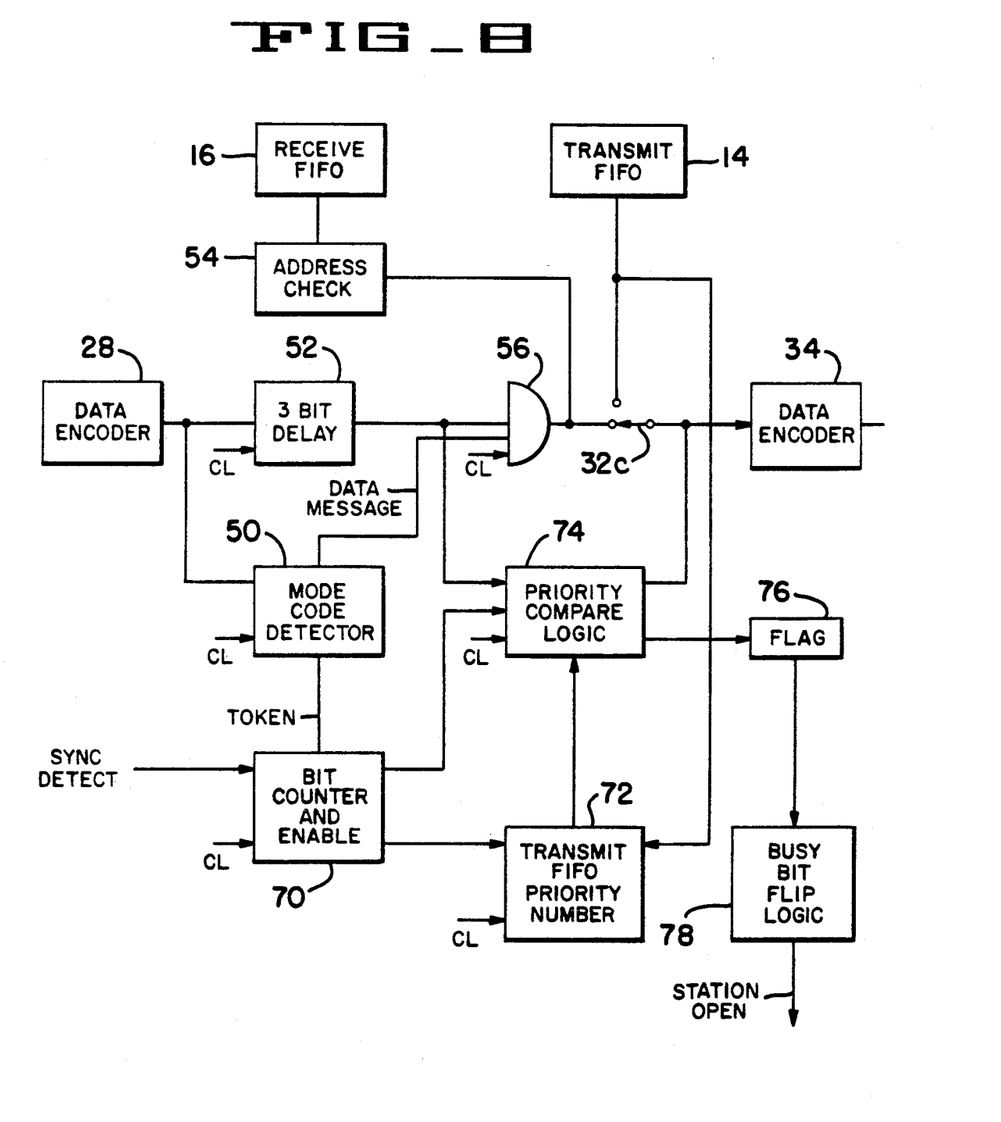
FIG. 8 is a block diagram of that portion of a station that is effective to convert a closed station to an open station.

FIG. 8 shows that portion of the circuit in each BIU station 10 in FIG. 1 that is effective to convert a previously closed station which had served as an active relay station, to an open station that will transmit a message waiting in its transmit FIFO buffer 14. The design objective is to introduce a delay and phase shift that is minimized at the moment when access is granted.

The incoming Manchester signal is supplied to data decoder 28 and after conversion to a logic signal is routed to the mode code detector 50 to determine whether a token or a data message frame is about to be received. After examining the three bits in the mode code field, a token identifying signal is supplied to bit counter and enable circuitry 70 which counts the receiver clock signals to generate enable pulses that allow correct interpretation of bits and fields. For example, the priority field in the access control message must be looked at bit-by-bit on-the-fly from bit 4 through bit 10. Any modification to the priority bits or the access control bit in bit field 11 must also be made on-the-fly.

If this station does not have a data message frame awaiting transmission, the priority compare logic 74 will not change an existing priority number in the priority field bit positions 4-10 of the token or change the access control bit in bit field 11.

Since the token is issued with a priority number of zero and the mode code for a token is selected to be three 0's, the entire token may consist of a sync signal followed by 0's in the next 15 bit positions as illustrated in FIG. 7. No end of transmission signal is provided in this embodiment because reading of the token message terminates at the end of a fixed number of bits following the sync signal. The transmitter is designed to transmit Manchester 0's unless another sync signal is supplied. Therefore, implementation of this system may be relatively simple.

An important feature of this system is that messages are caused to be transmitted on the basis of the priority of each data message. All data message frames that are transmitted on the ring bus are pre-assigned with a priority number when the data message frame is queued in transmit FIFO 14 in FIG. 1 ready for transmission. The assigned priority number is entered into transmit FIFO priority number register 72 of FIG. 8.

The token of FIG. 7 has a priority number consisting of seven bits in positions 4-10. In a binary format, the priority numbers from 0-127 are possible. As the token bits are clocked through priority compare logic 74, the priority number from register 72 is compared and modified on-the-fly so that when the token exits from this station, the token may have a higher priority number in its priority field.

If at this station a higher priority number is inserted, a flag 76 is set at that time. If the token returns and has exactly the same priority number, the access control bit in token field 11 is set to the "busy" condition and the "busy" bit flip logic 78 is set and a station open signal is generated, thus returning the switch 32 contacts to the positions illustrated in FIG. 6. Much of the beginning part of the token has already been re-transmitted prior to appearance of the station open signal. Transmission of the "busy" condition prevents any station from gaining access to transmit as a consequence of receiving a "busy" token and closes the previously open station. The "busy" token is transmitted under control of the clocking signal from VCO 22. Conversion to use clocking signals from the local crystal oscillator 24 of FIG. 5 is delayed until all data bits in the token have been transmitted.

If the priority number has been successfully inserted in the token and the flag 74 set and the token returns with a higher priority number as determined in priority compare logic 74, flag 76 is reset as access to transmit has to be denied. The station must thereafter initiate again the procedures necessary to acquire access to transmit. The reason a higher priority number was in the token is that another station on the ring bus has a data message frame with a higher priority that is also awaiting transmission.

If the token, when received, has a lower priority number than is in register 72, the higher priority number in register 72 is substituted for the lower priority number and the flag 76 is set.

If the token when received already has exactly the same priority number as is in register 72, nothing happens because flag 76 had not been set. The token continues around the ring bus until the station which inserted that priority number and set its flag 76, again receives the token in an unaltered form. At this time, the token is converted to a "busy" token.

If the priority number in register 72 is the highest possible (i.e. 127 in the illustrated example), the token is instantly converted to a "busy" token and relayed on the ring bus without waiting for the token to circulate around the ring before transmission of the data message frame. Obviously, no station can have a higher priority message.

If the next station also has a "highest" priority message, it can capture the "available" token that is always appended to each data message frame. This would allow two or more data message frames to be transmitted with a delay of only one token rotation. If a series of "highest" priority data message frames are simultaneously ready for transmission, access is granted on the basis of the first to receive the "available" token.

Control of the order in which messages are transmitted can be effected by the choice of the relative numeric values assigned for the first data message frame in each transmit FIFO buffer priority register number 72.

When the access bit of the access control message in the token of FIG. 7 is flipped to indicate a "busy" status, the "busy" bit logic 78 generates an station open signal which in effect causes switch 32 of FIG. 6 to change the position of all contacts 32a–32f. Control of the ring bus is thus transferred from the station last to transmit to the station which has now been granted access to transmit and indeed has started transmitting its data message frame. The ring bus is maintained by the local oscillator 24 in FIG. 6 of that station until a new station obtains access to transmit.

While only a single embodiment has been described, it is apparent that many changes and variations will become evident to those skilled in the art. All changes which fall with the scope of the claims and equivalents thereof are intended to be embraced thereby.

We claim:

1. In a first transmit-receive station adapted for connection to a digital data ring bus with a plurality of transmit-receive stations wherein no single transmit-receive station has a master oscillator connected to control the ring bus on a permanent basis and each transmit-receive station has two oscillators, a first of which produces a first clocking signal responsive to the frequency and phase of an incoming pulse train and the second of which produces a second clocking signal and is a crystal controlled oscillator having a frequency essentially equal to the frequency of the incoming data pulse train but at an indeterminate phase:

a transmitter connected to (1) relay data received on said ring bus and (2) send data on said ring bus which originates at said first transmit-receive station; and means connected to control the frequency and phase of signals outputted from said transmitter (1) from the first clocking signal when relaying the received data and (2) from the second clocking signal when sending said data originating at said first transmit-receive station, whereby the second clocking signal serves as a master oscillator for the ring bus during the period used for sending originating data.

2. The station of claim 1 further including means for minimizing phase shift in the transmitted signal when changing clocking signals to the transmitter comprising:

terminals associated with each oscillator for producing the oscillator output signal at a plurality of phases;

means for comparing the different phases of the oscillator output signal from the oscillator not controlling the frequency and phase of the transmitter output signal with the phase of the oscillator clocking signal that is controlling the frequency and phase of the transmitter output signals;

means coupled to the comparing means for selecting that phase of the oscillator output signal not controlling the transmitter which is nearest to the phase of the clocking signal from the other oscillator;

switching means for connecting the selected phase for controlling the transmitter when a change in clock signal source occurs.

3. The station of claim 1 further including means for minimizing a phase shift in the transmitted signal when changing clocking signals to the transmitter as the station converts from relaying received data to sending originating data comprising:

means for providing the second clocking signal at a plurality of different phases;

means for comparing the different phases of said second clocking signal with the phase of the first clocking signal; and means for using as the second clocking signal that phase which is nearest to the phase of the first clocking signal when starting to transmit said originating data.

4. The station of claim 1 further including means for minimizing a phase shift in the transmitted signal when changing clocking signals to the transmitter as the station converts from sending originating data to relaying received data comprising:

means for providing the first clocking signal at a plurality of different phases and at a frequency that is twice the frequency of the second clocking signal;

means for comparing the different phases of the first clocking signal with the phase of the second clocking signal; and means for using as the first clocking signal that phase which is nearest to the phase of the second clocking signal when starting to relay received data.

5. The station of claim 1 further comprising a data decoder controlled at all times by said first clocking signal and a data encoder controlled by the same clocking signal that is used to control the transmitter.

6. The station of claim 5 wherein the received and transmitted data pulse train signals are in a phase encoded Manchester format and the data signals outputted from the decoder are in a logical format and further comprising a first signal path for data signals from the decoder to a user application and a second parallel signal path for data signals from the decoder to the encoder only when the encoder is controlled by said first clocking signal and the station is relaying received data.

7. The station of claim 6 further comprising:
means for detecting whether an incoming pulse train signal is a data message frame or an access control message;
means responsive to the detection of an access control message when transmitting under control of the second clocking signal for re-issuing the access control message as a new data transmission; and
means for preventing retransmission of any data message frame when transmitting under control of the second clocking signal.

8. In a transmit-receive station, with a local user, adapted for connection to a high speed digital data ring bus:
a transmitter connected to relay data received on said ring bus and send data information originating at said transmit-receive station;
a receiver capable of simultaneously transferring data received on said ring bus to the local user and to said transmitter;
means for generating a first clocking signal having its frequency and phase controlled by the received data;
a local crystal controlled oscillator having a frequency essentially equal to the frequency of the received data but at an indeterminate phase for generating a second clocking signal;
means for connecting the first clocking signal to control operation of said receiver; and
switching means connected to control the frequency and phase of signals outputted from said transmitter (1) from one of said clocking signals when relaying received data and (2) from the other of said clocking signals when sending data information on said ring bus which originates at said transmit-receive station.

9. The station of claim 8 further comprising a data decoder controlled by said first clocking signal at all times and a data encoder controlled by the same clocking signal that is used to control the transmitter.

10. The station of claim 9 wherein the received and transmitted signals are in a phase encoded Manchester format and the data signals outputted from the decoder are in a non-return-to-zero logical format and further comprising a first signal path from the decoder to a user application and a second signal path from the decoder to the encoder only when the encoder is controlled by said first clocking signal and the station is relaying received data.

11. The station of claim 8 further including means for minimizing a phase shift in the transmitted signal when switching from said one clocking signal to said other clocking signal.

12. The station of claim 11 wherein the phase shift minimizing means comprises:
means for providing said other clocking signal at a plurality of different phases;
means for comparing the different phases of said other clocking signal with the phase of said one clocking signal; and
means for using as said other clocking signal that phase which is nearest to the phase of said one clocking signal when switching from said one clocking signal to said other clocking signal.

13. A dynamic loop system for controlling transmission of data bit signals on a ring bus for transmission of data among a plural number of stations wherein each station has first and second oscillators, the first being used for re-transmission of loop data bit signals that originate at another station and a second being used for transmission of loop data bit signals originating at said station, said system comprising;
means for controlling the frequency and phase of the first oscillator that receives loop data bit signals arriving at said station and to produce an output clocking signal in a controlled phase relative to said arriving data bit signals;
a phase selector circuit connected to provide output clocking signals from said second oscillator at a plurality of phases;
a phase comparison circuit connected to receive output signals from said first oscillator and from said phase selector circuit to produce a control signal; and
means connecting the control signal to an input of said phase selector circuit for connecting the phase of the output signal from said second oscillator used for controlling frequency and phase of transmission of data bit signals to reduce misalignment between the phase of signals controlling transmission of the start of a new originating signal and the phase of prior received data bit signals.

14. The system of claim 13, further comprising:
a transmit device connected to said ring bus for effecting said data bit signals transmission;
a first circuit including said first oscillator to control the frequency and phase of the transmit device during re-transmission;
a second circuit including said phase selector circuit to control the frequency and phase for the transmit device during original signal transmission; and
switching means for transferring control of the transmit device from one to the other of said first and second circuits.

15. In a ring bus transmission system having a plurality of stations each connected to alternately be "closed" to relay or be "open" to originate messages in a phase encoded Manchester signal that circulates around said ring bus, said system comprising at each station:
a first local oscillator and a second local oscillator;
a receiver for receiving signals on said ring bus;
a transmitter for sending signals on said ring bus, said transmitter being controlled by a clock signal from one of said first or second local oscillators;
means for controlling the first local oscillator frequency and phase of each station to constantly produce a clock signal which maintains sync with the received data bits and for controlling re-transmission when the station is "closed";
means whereby the transmitter is controlled when the station is "open" by a clock signal from said second local oscillator; and
means for varying the output phase of the second local oscillator to phase track the phase of the clock signal from the first oscillator when the station is in a "closed" condition so that upon converting to an "open" condition to originate a transmission of a data message, the new clock signal has a phase such that the shift from the phase of the first oscillator clock signal is minimized.

16. The system of claim 15 further comprising means for varying the output phase of the first local oscillator to phase track the phase of the clock signal from the second oscillator when the station is in an "open" condition so that upon converting to a "closed" condition to relay a received data message, the new clock signal has a phase such that the shift from the second oscillator clock signal is minimized.

17. The system of claim 15 wherein the frequency and phase control means for the first local oscillator includes a circuit which detects edges of the received data bit transitions and uses the position of said data bit edges relative to an output signal from the first local oscillator to synchronize the frequency and phase of the first local oscillator with the phase encoded data input signal.

18. In a ring bus system wherein each station is capable of transmitting to and receiving from other stations connected thereto on an asynchronous basis controlled by a token that begins circulating around the ring bus following transmission of each data message frame and precedes transmission of the next data message frame:
 means at the station which has concluded transmitting a data message frame for issuing said token with a status indicating the ring bus is available for transmitting a data message frame using a clocking signal from a local crystal controlled oscillator;
 a token buffer register having a token status detector at said station for receiving the issued token after the token has circulated around the ring bus;
 means at said station connected to the token buffer register for repeatedly re-issuing the token using a clocking signal from the same clock for so long as the token continues to have a status indicating that the ring bus remains available for transmission of a new data message frame.

19. The system of claim 18 further having means connected to an output signal from said token status detector for producing a logic signal that is effective if the token has a status indicating that access to transmit has been granted to another station on the bus, to stop further transmission of said token and to switch to a new clock for subsequent transmission of a received data message frame.

20. The system of claim 18 wherein each station has:
 means for generating a first clocking signal based on the frequency and phase of a signal received from the ring bus in addition to said local crystal controlled oscillator for generating a second clocking signal;
 a transmitter connected to be controlled by one of the first or second clocking signals; and
 means responsive to an output signal from said token status detector that is effective to change the clocking signal which controls said transmitter when the token has a status indicating that access to transmit has been granted to another station on said bus.

21. In a ring bus system wherein each station is capable of transmitting to and receiving from other stations connected thereto on an asynchronous basis controlled by a token that is circulated around the ring bus following transmission of each data message frame:
 a first clock means responsive to an incoming pulse train at the station on the ring bus for generating clocking signals for controlling the frequency and phase of a station transmitter for relaying on the ring bus data messages originating at another station connected to said ring bus;
 a second crystal controlled clock means at the station that is connected to the station transmitter to control the frequency and phase of said station transmitter for transmitting data message frames originating at said station and a token issued thereafter, said token having a status indicating the ring bus is available;
 a token buffer register at said station for receiving the issued token after the token has circulated around the ring bus; and
 means at said station connected to the token buffer register for repeatedly re-issuing the token using a clock signal from said second clock means for so long as the token still has a status indicating the ring bus remains available; and
 means effective, when the received token indicates that a new data message has originated at another station, for substituting a clock signal from said first clock means for the clock signal used for re-issuing the token.

22. The system of claim 21 further having means connected to an output signal from said token buffer register for producing a logic signal that is effective to stop further transmission of said token if the token has a status indicating that access to transmit has been granted to another station on the bus.

* * * * *